Patented Nov. 18, 1941

2,262,951

UNITED STATES PATENT OFFICE 2,262,951

GLASS COMPOSITION, BATCH THEREFOR, AND METHOD OF MAKING IT

Aaron K. Lyle, West Hartford, Conn., assignor to Hartford-Empire Company, Hartford, Conn., a corporation of Delaware No Drawing. Application January 3, 1940, Serial No. 312,252

10 Claims. (Cl. 106—54)

The present invention relates to a glass composition, a batch therefor, and the method of making this glass.

It has been desired for some time to provide a low-alkali glass for making containers and other articles, which will have good chemical durability combined with ease of melting and fining and certain other desirable properties. However, when such low-alkali glasses were made in the past, they have involved the use of relatively large amounts of boron oxides to form glass of the heat-resisting type, such as the borosilicate glasses commonly used for oven ware which require high melting temperatures and other special conditions rendering them more costly than standard glasses, or other difficulties have been encountered which have to a large extent discouraged those experimenting with these low-alkali glasses.

The present invention relates to glass of the soda-lime type, as distinguished from boro-silicate type glasses, or heat resisting glasses, above referred to, these terms to be interpreted in the manner in which they are ordinarily interpreted in the commercial art.

An object of the present invention is to provide such a low-alkali glass, which will have certain desirable properties both as to its characteristics during the melting, fining and fabricating of articles therefrom and as to the characteristics of the articles themselves made from this glass. Specifically the desired characteristics of a glass in accordance with the present invention are good chemical durability, easy melting and fining, low cost of the ingredient materials, good color, low checking characteristics, desirable working properties, and improved homogeneity. All these have been achieved to a major extent by the glass of the present invention, as will appear more fully hereinafter.

A further and more specific object of the invention is to provide a glass of the character above set forth containing combined fluorine, which will be homogeneous, and will have desirable working qualities and low checking characteristics.

A further object of the invention is to provide a batch composition for making an improved glass as aforesaid.

Other and more specific objects and advantages of the present invention will appear hereinafter and will be pointed out in the appended claims.

The glass of the present invention will come within the following limits as to the principal ingredients, which are given in tabular form:

Table 1

| Material | Low limit | High limit |
|---|---|---|
| | Percent | Percent |
| $SiO_2$ | 74.5 | 80.0 |
| $R_2O_3$ | 1.5 | 6.0 |
| RO | 2.0 | 10.0 |
| Alkali | 10.0 | 14.5 |
| Fluorine | 0.15 | 0.8 |

The percentages given are those as would be determined by a chemical analysis of the glass.

The term $R_2O_3$ used in Table 1 is intended to include certain mixed oxides, principally $Al_2O_3$ and also certain relatively small amounts of impurities, such as iron (calculated as $Fe_2O_3$).

The term RO in Table 1 includes bivalent oxides, specifically CaO, MgO, ZnO and BaO. In the usual case calcium oxide (CaO) is the principal constituent.

The "alkali" of the above table is usually principally $Na_2O$; although certain amounts of $K_2O$ may also be included therein.

The fluorine present in the final glass as determined by analysis is somewhat lower than would be determined by calculation from the batch ingredients as hereinafter noted due to the volatility of fluorine and its compounds. In Table 1, the fluorine would probably be put in as calcium fluoride ($CaF_2$), which, calculated from the batch composition, would be present in amounts of from 0.5% to 3.0%. These amounts of $CaF_2$ in the batch will give approximately the amounts of fluorine in the glass by analysis, namely 0.15% and 0.8% for the lower and upper limits respectively. By calculation, however, the fluorine present would be 0.25% and 1.5% respectively for these amounts of $CaF_2$.

A considerable number of different glasses have been made within the above limits, certain of which are included in the following table, which gives the specific composition of these glasses. In this table the glass given as Example I is the preferred form in accordance with the present invention.

Table 2

| Material | I | II | III | IV | V | VI |
|---|---|---|---|---|---|---|
| | Percent | Percent | Percent | Percent | Percent | Percent |
| SiO2 | 76.0 | 76.0 | 75.8 | 78.0 | 80.0 | 77.0 |
| R2O3 | 3.0 | 2.3 | 3.2 | 3.0 | 3.0 | 4.0 |
| RO | 6.9 | 7.0 | 6.7 | 7.0 | 3.0 | 4.7 |
| Alkali | 13.6 | 14.4 | 13.1 | 12.0 | 14.0 | 10.0 |
| Fluorine | 0.2 | 0.32 | 0.6 | 0.5 | 0.5 | 0.5 |
| B2O3 | | | | | | 4.0 |

The percentages given are those as would be determined by a chemical analysis of each glass, except as hereinafter noted.

The RO constituent of Example III of Table 2, which is given as a total of 6.7% may be broken down into CaO 4.1%, MgO 1.4% and BaO 1.2%.

The RO constituent of Example No. VI of Table 2 above, which is given as a total of 4.7% may be broken down into ZnO 4.0% and CaO 0.7%, the ZnO thus replacing a large part of the CaO in this case. It is noted further that in this example a part of the alkali is replaced by B2O3.

The amounts of fluorine given in Examples IV, V and VI of Table 2 are those determined by calculation from the batch rather than those determined by analytical methods.

The compositions as given in both Tables 1 and 2 are such as would be reported by a chemical laboratory of a completed sample of glass. They do not take into account certain minor constituents, some of which may be present in the finished glass, such as one or more of the oxides of sulphur, which is usually expressed as SO3 and which may be present to a certain extent in the finished glass. Also, they do not take into account certain of the essential raw materials going to make up the batch composition from which these glasses were made, these materials being generally classed as fining agents and/or decolorizers, because much, if not all, of these two classes of materials are volatilized or otherwise lost during the making of the glass.

It is noted that fluorine, which has previously been used by glass makers, for example in the making of opalescent or milk white glass, is given herein as one of the essential constituents of the final glass. It has been found that smaller percentages of fluorine in the batch than that necessary to give 0.15% of combined fluorine in the final glass are not effective to produce the desired results in accordance with the present invention; while amounts of fluorine in excess of that given as the upper limit for combined fluorine, namely 0.8%, cause a progressive decrease in certain desirable characteristics of the glass, specifically the homogeneity thereof.

In order that the percentages of fluorine given herein as determined by analysis may have a definite specific meaning, in view of the fact that analytical methods for determining the presence of combined fluorine in glass are not well developed, a method of analysis for fluorine in glass by which these results were obtained and which will hence serve to interpret these results is hereby given. This method is as follows:

1. Fuse 1 gm. of glass with 4 gm. Na2CO3, and allow the melt to solidify in a thin layer in the crucible.
2. Nearly fill the crucible with water, and allow to digest on the steam bath until the melt is thoroughly disintegrated.
3. Transfer to a 250 ml. Claissen flask, rinsing the crucible several times with distilled water. The flask should contain 8 to 10 glass beads to prevent bumping.
4. Add cautiously 35 ml. of concentrated sulphuric acid while keeping the flask cooled in running water. Close the flask with a 2-hole rubber stopper through which passes a thermometer and a 4 mm. glass tube extending nearly to the bottom of the flask. The tube is connected to a 2-liter Florence flask filled with water and serving as a steam generator. The connection between the generator and distilling flask is closed by means of a pinch-cock.
5. Connect the distillation flask to a condenser and distil until the temperature of the liquid reaches 135° C. In the meantime, heat the water in the Florence flask to boiling, and when 135° C. is reached, admit steam into the Claissen flask. Adjust the rate of flow of the steam (by regulating the two burners) so as to keep the volume and temperature of the contents of the Claissen flask about constant.
6. Continue the distillation until about 400 ml. of distillate has collected. Add phenolphthalein and sufficient N/1 NaOH to make the solution distinctly alkaline, and evaporate to about 100 ml.
7. Cool, add 10 drops of sodium alizarin sulfonate indicator and dilute HCl until slightly acid. Neutralize with N/1 NaOH, then make faintly acid with N/10 HCl. Add 1 ml. of the buffer solution and titrate with N/10 thorium nitrate solution to a faint, permanent pink.
8. The thorium nitrate solution may be standardized against a known NaF solution containing .0002 gm. F per ml. The fluoride solution, in turn, is checked by the lead chlorofluoride method. A blank determination should be made on a glass which contains no fluorine.

SOLUTIONS

*a. N/10 thorium nitrate*

Dissolve 13.8 gm. of Th(NO3)4.4H2O in water and dilute to 1 liter.

*b. Known fluorine solution*

Dissolve .45 gm. NaF and dilute to 1 liter. The solution will contain about .0002 gm. F per ml.

*c. Buffer solution*

Dissolve 9.45 gm. monochloracetic acid and 2.00 gm. NaOH and dilute to 100 ml. with distilled water.

*d. Sodium alizarine sulfonate indicator*

This is an aqueous solution of .05% concentration.

As stated hereinabove, one feature of this invention is the provision of a batch composition from which a desired glass will result on melting. This batch composition will normally employ as raw materials: sand, as a source of silica; some suitable raw material containing alumina, such as feldspar; a lime or dolomite material as a source of CaO and MgO (RO); soda ash or salt cake, or both, as a source of alkali; and a fluorine compound, usually fluorspar, as a source of fluorine. In using fluorspar, however, the amount of calcium so introduced must be taken into account in calculating the amount of lime or other materials used as a source of RO which is included in the composition. In addition to this, suitable amounts of fining agents (of which salt cake is usually considered one) and decolorizing material will normally be added.

As a specific example of the batch used in making the preferred form of glass (Example I of Table 2 above), the following raw materials in the weight proportions given have been found to be satisfactory:

| | |
|---|---|
| Sand | 1000 |
| Soda ash | 300 |
| Raw dolomite | 160 |
| Feldspar (nepheline syenite, about 24 to 26% $Al_2O_3$) | 150 |
| Salt cake | 10 |
| Nitre | 2 |
| Arsenic | 1 |
| Fluorspar | 15 |

When making up a new glass, a calculation is normally made, based upon the composition of the batch materials, of the probable glass composition, such as may eventually be determined by an analysis of the glass when made. Such a calculation will give substantially the same results as the final analysis for all non-volatile ingredients, including for example the $SiO_2$, $R_2O_3$, RO and alkali given in the two tables above. However, it has been found by experience that the amount of fluorine determined by calculation from the batch ingredients will always be in excess of that found in the glass as combined fluorine by analytical methods. For example, a minimum of 0.5% fluorspar ($CaF_2$) is put into a glass, in accordance with the present invention, and a maximum of 3.0%. Due to the volatility of fluorine compounds and also of fluorine itself, if it in fact ever exists as elemental fluorine, these amounts of combined fluorine in the batch ingredients will result in substantially the amounts specified in Table 1 being present in the finished glass as determined by analytical methods.

Considering now the various properties of the glass of the present invention, it is found that as to the aggregate of these properties, the present glass is superior to other known glasses. These properties will now be considered.

Chemical durability

The prior art has attempted to increase the chemical durability of glass by increasing the content of alumina and lime and decreasing the amount of alkali used. This in fact results in improved chemical durability and also gives a quick setting glass, which from some points of view is desirable. However, glasses of this type while being improved in certain respects, have been subject to certain accompanying disadvantages, one of which is that articles made therefrom frequently have checked finishes and "washboard" surfaces, and also may have a color which is unsatisfactory or difficult to control. In making the better types of glass-ware where a clear, colorless glass is called for, it is often difficult to obtain glass which is free from an undesirable greenish or greyish tint.

In testing glass articles, such as containers, for chemical durability, the article to be tested is filled with water, or a water solution of a strong inorganic acid or base, and then treated at a predetermined temperature, for a predetermined time, as by placing the article in an autoclave. The amount of alkali released by the glass is determined by the change in the alkali content of the solution within the article. This amount is then compared with that of other commercial glasses.

When testing the preferred glass (Example I of Table 2) in this manner, it is found that this glass releases from 3 to 10 mg. of alkali, expressed as NaOH, per liter of solution, while standard glasses now in commercial use yield on the same basis, from 12 to 20 mg. This test has been found to be a good measure of the chemical durability of different types of glass in use.

Ease of melting and fining

The best test of the ease of melting and fining of glass is to melt this glass in a commercial tank or even a small tank, such as a day tank, and compare the action thereof in respect to the known action of other standard glasses.

Another test is to melt a given sample of a batch material to make glass in a crucible, making the same test with the same amount of one or more known glasses in the same size crucible exposed to the same temperature conditions. The glasses are exposed to heat in the crucible until all the batch material has been melted and the glass resulting therefrom is free from seeds or small bubbles. The time required to obtain this result is considered a measure of the melting and fining characteristics of a given glass.

Using this crucible test and the batch material to make up the preferred form of glass (Example I of Table 2), the time required to fine this glass completely to a seed-free condition at 1500° C. was 30 minutes. The same test was made with a standard commercial glass, which as far as is known is the closest commercially-used glass to the composition of the glasses of the present invention, although falling outside the scope thereof as given in Table 1 above. The time required to melt and fine this known commercial glass at 1500° C. was 90 minutes. The times in each case are accurate to the nearest 10 minutes, so that in regard to the second glass named, it was found that at 80 minutes the glass had not completely fined, while at 90 minutes the fining was complete.

Thus from the practical glass makers' point of view, using the glass of the present invention, a given furnace or tank will fine the glass so much quicker than other glasses, for example the commercial glass tested, that it will be possible to get a greater production per 24 hours from a given tank furnace installation. On the other hand, if a particular production is desired, it is possible by the use of the glass of the present invention to melt and fine it in a much smaller furnace than can be done with other known glasses. In either case there is an obvious saving to the manufacturer.

Cost

Glasses in accordance with the present invention are relatively low in cost as compared with other glasses having desirable characteristics. In this respect, as the present glass is in the class which may be considered as a high-silica glass, it has, of course, a relatively large amount of silica as an essential ingredient. Inasmuch as this is the cheapest ingredient of any glass, it helps in keeping the cost of the glass making materials or batch down.

Also, the use of borax and prepared barium compounds, and/or other expensive fining aids, is minimized if not completely eliminated, as compared with the use of such materials in other glasses even approaching the present glass as to properties. Thus, the present glass, particularly the preferred form thereof given in Example I of Table 2 herein, may be considered a relatively cheap glass as compared with others which approach it in quality.

Color

The glass of the present invention is a clear, colorless, transparent glass, this being determined by inspection in comparing different types of glass. This seems to be due not only to the purity of the ingredients, which of course render any glass superior in color, but also to the fact that for a given amount of impurities, usually iron compounds, the color imparted to the glass seems to be somewhat less than that of other known glasses.

In this respect, it is specifically contemplated that the present glass may be used not only as a clear, colorless glass, but also as a base for making glasses having desired colors, such for example as amber, light or dark greens, blue, etc. For making colored glasses, there is added to the glass of the present invention suitable coloring agents, which may be the same conventional coloring agents used in the same amounts and proportions as is common in the glass industry. Inasmuch as the nature and amount of the coloring agents used in imparting desired colors to the basic glass herein disclosed per se form no part of the present invention, such coloring agents are not specifically discussed herein.

Low checking characteristics

The phenomenon known in the trade as "checking" is a characteristic of some glasses which is very undesirable. It is evidenced in the fabrication of articles from a given glass by the formation on parts of the surface of the articles of minute crackled portions, probably due to a skin being formed upon the surface of the glass body during the initial part of the working or fabrication thereof, this skin being subsequently stretched in the later portions of the working or fabrication and cracking to form crackled or checked portions on the surface.

The test for a given glass as to its checking characteristics is merely the practical one of fabricating articles therefrom and finding out from the practical use of the glass how it compares with other known glasses which have been similarly tried out.

One of the chief sources of breakage of glass articles has been found to be very minute checks on the surfaces of such articles or portions thereof. These checks or cracks are sometimes not immediately visible to the naked eye, but may become so in the course of time. However, if an article is inspected with a magnifying glass under a strong light, the checks on the surface may be readily seen. The glass of the present invention, particularly the preferred form thereof, is especially free from trouble due to checking.

Working properties

The working properties of a given glass are particularly important when that glass is to be fabricated by mechanical means, such as conventional glassware forming machines.

The working range of the glass should be relatively long for satisfactory machine fabrication; that is, the change in viscosity during the cooling of the glass within the working range should be relatively slow. The working range is that range of the average temperature of a portion of glass during the fabrication thereof in a forming machine. This is necessarily connected with the viscosity changes with temperature for the glass in question. There are no exact mathematical definitions of the limits of this range. However, the working range and the working properties of a given sample of glass can be evaluated within reasonable limits by measuring the temperature difference between two predetermined points of respectively predetermined viscosities, such as the softening point or temperature and the strain point or temperature for a given glass.

The softening point or temperature of glass is that at which the viscosity of the glass is $4.5 \times 10^7$ poises. The strain point or temperature of a glass is that at which the viscosity of the glass is $4.0 \times 10^{14}$ poises.

For standard glasses the softening temperature may be in the neighborhood of 700° C. and the strain point, 490° C., this giving a difference of 210° C. For the preferred glass (Example I of Table 2 above) the softening temperature is 725° C. and the strain point 478° C., giving a difference of 247° C. This glass thus has a somewhat longer working range than standard glasses as given above. The glass of Example III of Table 2 above has a softening temperature of 717° C. and a strain point of 475° C., giving a difference of 242° C.

Homogeneity

A glass according to the present invention has a superior homogeneity to that which would be expected, this being productive of certain new and unusual results. It has been found that the addition of fluorine to glass raised the liquidus temperature thereof. Under normal circumstances, it would be assumed that an increase in the liquidus temperature would be undesirable and would render the glass more difficult to work and more subject to devitrification in the normal processes and apparatus used in working the glass. In order that the question of liquidus temperature and its relation to devitrification may be understood, a definition of this temperature is hereby given.

When a glass is cooled, at some temperature the melt becomes saturated with a crystalline phase (just as a concentrated salt solution on cooling becomes saturated with salt crystals); and if undercooling does not take place, crystals will separate. The temperature at which this separation begins is known as the "liquidus temperature." When a devitrified glass is heated, and at each temperature sufficient time is given for enough crystals to dissolve to saturate the liquid, the crystals will gradually and continuously decrease in amount, and finally disappear. The temperature at which the last traces of crystals disappear is also the "liquidus temperature"; and experiments in which the molten glass is cooled give the same temperature for the liquidus as experiments in which the devitrified glass is heated.

It has been found as aforesaid that the liquidus temperature for a given glass is increased by the presence of fluorine therein in the order of about 12° for each 0.1% increase in fluorine in the glass. The actual liquidus temperatures for the glasses of Examples I, II and III of Table 2 above are: (I) 1080 to 1100° C.; (II) 1104° C., and (III) 1180° C.

With an increased liquidus temperature one would normally expect to run into additional trouble to avoid devitrification, as the glass, particularly in a forehearth or gathering pool, must be kept above the liquidus temperature in order to prevent crystallization therein, which is known in the art as "devitrification." However, in spite of the relatively high liquidus temperatures of the glasses of the present invention, incident in part at least to the presence of fluorine therein, these glasses are so much more homogeneous than prior art glasses that no troubles are met with even when operating with this glass in a forehearth with an average temperature of only about 50° C. above the liquidus temperature. As compared to this, it has been found necessary to operate at least 100° C. above the liquidus with other low-alkali glasses.

With many ordinary bottle glasses no problem exists as the normal temperatures of forehearth operation or of the gathering pool are well over 100° C. higher than the liquidus temperatures, which for such glasses are relatively low. These ordinary glasses are not, however, of the low-alkali class and have a relatively poor chemical durability and a substantially lower viscosity. It is only when the proportion of silica or lime (RO), or both, are relatively high and/or the alkali is relatively low in a glass that the liquidus temperature is sufficiently high in respect to the normal temperatures at which forehearths and gathering pools are operated that devitrification becomes a serious problem. With the present glass this trouble is in effect eliminated due to the possibility of operating within a relatively narrow range above the liquidus temperature.

A theory tending to explain the lack of trouble from devitrification with the glass of the present invention is that the devitrification depends to a large extent upon the lack of homogeneity in the glass and occurs when a non-uniform constituent of the glass, having the highest crystallization temperature, begins to crystallize out. With a homogeneous glass, as is provided by the present invention, there is no single element or constituent of the glass which is present by itself so as to enable it to crystallize out in advance of other portions of the glass to the extent at least of causing devitrification at temperatures above the general liquidus temperature of the glass as a whole. Thus, one is enabled to maintain the glass at a temperature but slightly above the liquidus temperature while still avoiding devitrification.

The homogeneity of a glass may also be measured by examining a sample of the finished glass, for instance a ring section cut out from a bottle, in polarized light and examining the strain characteristics therein, which increase with a lack of homogeneity in the glass. When tested in this way, the glass of the present invention is superior to other known low-alkali glasses.

Homogeneous glass is important in the machine fabrication of glassware in that it permits the continuous operation of a glass forming machine with a minimum of machine adjustments, such as are required to compensate for a lack of homogeneity in the glass.

While there is described herein a preferred form and certain other glasses carrying out the present invention, and while limits have been established as set forth hereinabove defining the composition of a glass and batch materials for making it in accordance with the present invention, the invention is to be understood as measured solely by the scope of the appended claims, which are to be construed as broadly as the state of the prior art permits.

I claim:

1. A clear, transparent, soda-lime type glass, comprising 74.5–80.0% $SiO_2$, 1.5–6.0% $R_2O_3$, 2.0–10.0% RO, 10.0–14.5% alkali, 0.15–0.8% fluorine, and a small amount of material remaining in the glass which was introduced as fining material of an oxidizing character, said glass having the properties of good chemical durability, easy melting and fining, low cost, excellent color, low checking characteristics, desirable working qualities and excellent homogeneity.

2. A clear, transparent, soda-lime type glass, comprising 75.8–80.0% $SiO_2$, 2.3–4.0% $R_2O_3$, 3.0–7.0% RO, 10.0–14.4% alkali, 0.2–0.6% fluorine, and a small amount of material remaining in the glass which was introduced as fining material of an oxidizing character, said glass having the properties of good chemical durability, easy melting and fining, low cost, excellent color, low checking characteristics, desirable working qualities and excellent homogeneity.

3. A clear, transparent, soda-lime type glass, comprising 76.0% $SiO_2$, 3.0% $R_2O_3$, 6.9% RO, 13.6% alkali, 0.2% fluorine, and a small amount of material remaining in the glass which was introduced as fining material of an oxidizing character, said glass having the properties of good chemical durability, easy melting and fining, low cost, excellent color, low checking characteristics, desirable working qualities and excellent homogeneity.

4. A batch for making a soda-lime type glass, comprising sand, alumina, lime, alkali and a fluorine compound mixed in such proportions that the glass made therefrom, as determined by calculation from the batch, will be clear and transparent and will have a composition of 74.5–80.0% $SiO_2$, 1.5–6.0% $R_2O_3$, 2.0–10.0% RO, 10.0–14.5% alkali, 0.25–1.5% fluorine, and fining agents which are collectively oxidizing in character, said glass further having the properties of good chemical durability, easy melting and fining, low cost, excellent color, low checking characteristics, desirable working qualities and excellent homogeneity.

5. A batch for making a soda-lime type glass, comprising sand, alumina, lime, alkali and a fluorine compound mixed in such proportions that the glass made therefrom as determined by calculation from the batch, will be clear and transparent and will have a composition of 75.8–80.0% $SiO_2$, 2.3–4.0% $R_2O_3$, 3.0–7.0% RO, 10.0–14.4% alkali, 0.25–1.5% fluorine, and fining agents which are collectively oxidizing in character, said glass further having the properties of good chemical durability, easy melting and fining, low cost, excellent color, low checking characteristics, desirable working qualities and excellent homogeneity.

6. A batch for making a soda-lime type glass, comprising the following ingredients in substantially the weight proportions given:

| | |
|---|---|
| Sand | 1000 |
| Soda ash | 300 |
| Raw dolomite | 160 |
| Feldspar (nepheline syenite about 24 to 26% $Al_2O_3$) | 150 |
| Salt cake | 10 |
| Nitre | 2 |
| Arsenic | 1 |
| Fluorspar | 15 | the glass made from melting this batch having a composition of $SiO_2$–76%, $R_2O_3$–3.0%, RO–6.9%, alkali 13.6%, fluorine 0.2%, and having the properties of good chemical durability, easy melting and fining, low cost, excellent color, low checking characteristics, desirable working qualities, excellent homogeneity and is clear and transparent.

7. A soda-lime type glass according to claim 1, wherein a part of the alkali is replaced by $B_2O_3$, the glass having a $B_2O_3$ content of less than 5%.

8. A soda-lime type glass in accordance with claim 1, combined with conventional coloring agents to form a colored glass, while still retaining the properties of the glass of claim 1, other than color.

9. The method of making a clear, transparent, soda-lime type glass, comprising mixing together sand, alumina, lime, alkali, a fluorine compound and fining agents which are collectively oxidizing in character in such proportions as to give upon melting of the mixture a glass having an analysis calculated from the constituents of the batch mixture 74.5–80.0% $SiO_2$, 1.5–6.0% $R_2O_3$, 2.0–10.0% RO, 10.0–14.5% alkali, and 0.25–1.5% fluorine, and melting the batch mixture to form a clear, transparent glass which will have the properties of good chemical durability, easy melting and fining, low cost, excellent color, low checking characteristics, desirable working qualities and excellent homogeneity.

10. The method of making a clear, transparent soda-lime type glass, comprising mixing together the following ingredients in substantially the following proportions:

| | |
|---|---:|
| Sand | 1000 |
| Soda ash | 300 |
| Raw dolomite | 160 |
| Feldspar (nepheline syenite about 24 to 26% $Al_2O_3$) | 150 |
| Salt cake | 10 |
| Nitre | 2 |
| Arsenic | 1 |
| Fluorspar | 15 | and melting the mixture to form a clear, transparent glass which will have the properties of good chemical durability, easy melting and fining, low cost, excellent color, low checking characteristics, desirable working qualities and excellent homogeneity.

AARON K. LYLE.